United States Patent

Boltze et al.

[15] 3,692,818
[45] Sept. 19, 1972

[54] NEW PHARMACOLOGICALLY ACTIVE ESTERS OF N-(3-TRIFLUOROMETHYLPHENYL)-ANTHRANILIC ACID

[72] Inventors: Karl-Heinz Boltze, Bensberg-Kippekausen; Otfried Brendler, Cologne, Mulheim; Dietrich Lorenz, Bensberg, all of Germany

[73] Assignee: Troponwerke Dinklage & Co., Cologne-Mulheim, Germany

[22] Filed: July 16, 1970

[21] Appl. No.: 55,563

[30] Foreign Application Priority Data

Aug. 1, 1969    Germany..........P 19 39 112.9

[52] U.S. Cl..............................260/471 R, 424/309
[51] Int. Cl................................C07c 101/54
[58] Field of Search.........................260/471 R

[56] References Cited

OTHER PUBLICATIONS

Wagner; R. B., Syn. Org. Chem. (1967), Pub. by John Wiley and Sons, Inc. (QD 262W24), page 484 Relied on.

*Primary Examiner*—Lorraine A. Weinberger
*Assistant Examiner*—L. Arnold Thaxton
*Attorney*—Burgess, Dinklage & Sprung

[57] ABSTRACT

Compounds of the general formula:

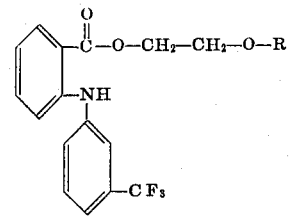

in which R represents the radical

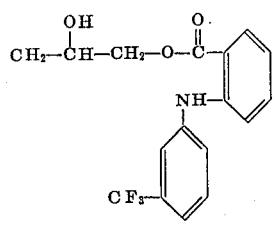

or a lower alkyl group having up to three carbon atoms in which one or two hydrogen atoms are replaced by hydroxyl groups, acyloxy groups having up to four carbon atoms, or lower hydroxyalkoxy groups, having an antiflammatory action.

7 Claims, No Drawings

NEW PHARMACOLOGICALLY ACTIVE ESTERS OF N-(3-TRIFLUOROMETHYLPHENYL)-ANTHRANILIC ACID

This invention relates to new pharmacologically active esters of N-(3-trifluoromethylphenyl)-anthranilic acid and process for their preparation.

The invention provides compounds of the general formula I:

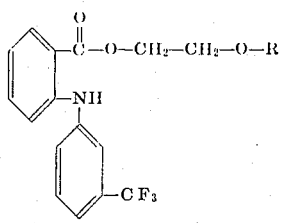

in which R represents a radical II:

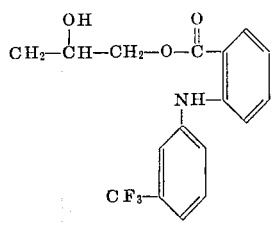

or a lower alkyl group having up to and including three carbon atoms in which one or two hydrogen atoms are replaced by hydroxyl groups, acyloxy groups having up to and including four carbon atoms or lower hydroxyalkoxy groups.

These lower hydroxyalkoxy groups which may be present preferably contain up to and including four carbon atoms and up to and including three hydroxyl groups.

It is known that N-(3-trifluoromethylphenyl)-anthranilic acid (hereinafter to be referred to as III) has a marked antiinflammatory action (see WINDER et al., Arthrit. Rheumat. 6, 36–47 (1963) or D.E. BARNARDO et al., Brit. med.J. 1966 II, pages 342–343). The strongly acid properties of this compound, which may cause disturbances of the gastrointestinal tract, represent a disadvantage to the use of this compound. It has therefore already been proposed to use the aluminium salt instead of the free acid (see French Pat. No. 1,424,797). Another disadvantage is that for local application the free acid cannot be used in the form of a gel as the ionogenically active substances prevent gel formation.

The compounds according to the invention have the advantage over III that while having the same marked antiinflammatory action as III they do not cause any gastrointestinal disturbances, are also effective when administered orally and moreover can be worked up into gels.

In addition, they have a considerably wider therapeutic range than III since the $LD_{50}$ values are about 1.5 to 3 times higher than those of III. The positive protein turbidity test of MIZUSHIMA (see Arch. int. Pharmacodyn. 157 (1965), page 115 et seq.) moreover shows that the compounds develop their own activity and their effect is not due only to the hydrolysis of I which takes place in the body.

Preparation of the compounds according to the invention of the general formula I is carried out by reacting a metal salt, preferably an alkali metal salt, of N-(3-trifluoromethylphenyl)-anthranilic acid with compounds of the general formula $$X - CH_2 - CH_2 - O - R, IV$$

in which R has the meaning mentioned above and X represents a halogen atom or a sulphonic acid ester radical. The reaction takes place most readily in inert solvents such as aromatic hydrocarbons, e.g., benzene, toluene or xylene, or in polar solvents such as dimethylformamide. The rate of reaction and yield are increased by use of elevated temperature. Temperatures in the region of the boiling points of the solvents are normally employed.

The invention covers pharmacological preparations which contain the new compounds in addition to the usual vehicles and carriers.

The following Examples illustrate the invention:

EXAMPLE 1

2-(2-Hydroxyethoxy)-ethyl ester of N-(3-trifluoromethyl-phenyl)-anthranilic acid.

16.0 g (0.05 mol) of the potassium salt of N-(3-trifluoromethylphenyl)-anthranilic acid are dissolved in 60 ml of dimethylformamide and heated to 110° C, and 6.2 g (0.05 mol) of 2-(2-chloroethoxy)-ethanol are slowly added. The reaction mixture is then heated to boiling for 2 hours. The precipitated potassium chloride is filtered off and the solvent is removed by evaporation. The residue is separated over a column with 400 g of silica gel (particle size 0.05 to 0.2 mm), using a 1:1 mixture of cyclohexane and glacial acetic acid as eluting agent. 16.0 g of the 2-(2-hydroxyethoxy)-ethyl ester of N-(3-trifluoromethylphenyl)-anthranilic acid are obtained in the form of a pale yellow oil which does not crystallize and cannot be distilled.

For $C_{18}H_{18}F_3NO_4$
Calculated: C 58.51% H 4.92%; N 3.79%;
Found: C 55.37%; H 4.87%; N 3.71%.

The following compounds were prepared by the same method:

EXAMPLE 2

2-[2-(2-hydroxyethoxy)-ethoxy]-ethyl ester of N-(3-tri-fluoromethylphenyl)-anthranilic acid.

From 0.1 mol each of the potassium salt of N-(3-trifluoromethylphenyl)-anthranilic acid and 2-[2-(2-chloroethoxy)-ethoxy]-ethanol. Pale yellow oil; Yield 16.0 g. (38.7% of the theory).

For $C_{20}H_{22}F_3NO_5$:
Calculated: C 58.11%; H 3.36%; N 3.39%;
Found: C 58.19%; H 3.17%; N 3.67%.

EXAMPLE 3

2-(2-acetoxyethoxy)-ethyl ester of N-(3-trifluoromethyl-phenyl)-anthranilic acid.

From 18.9 g of the potassium salt of N-(3-trifluoromethylphenyl)-anthranilic acid and 10.0 g of 2-(2-chloroethoxy)-ethyl acetate. Pale Yellow oil; yield 14.7 g (59.5% of the theory).

For $C_{20}H_{20}F_3NO_5$:
Calculated: C 58.39%; H 4.90%; N 3.41%;
Found: C 58.21%; H 4.91%; N 3.41%.

EXAMPLE 4

2-(2,3-Dihydroxy-propoxy)-ethyl ester of N-(3-trifluoromethyl-phenyl)-anthranilic acid.

63.8 g (0.2 mol) of the potassium salt of N-(3-trifluoromethylphenyl)-anthranilic acid and 27.8 g (0.18 mol) of 2-(2,3-dihydroxy-propoxy)-ethyl chloride are dissolved in 50 ml of dimethylformamide and heated to 80° C with stirring for 3 hours. After removal of the solvent by evaporation, the residue is separated over a column with 400 g of silica gel (particle size 0.05 to 0.2 mm), using acetone and acetone/ethylene chloride 1:1 as eluting agent. 28 g of 2-(2,3-dihydroxy-propoxy)-ethyl ester of N-(3-trifluoromethylphenyl)-anthranilic acid are obtained.

For $C_{19}H_{20}F_3NO_5$:
Calculated: C 57.13%; H 5.05%; N 3.50%;
Found: C 57.36%; H 5.16%; N 3.48%.

EXAMPLE 5

2-{3-[N-(3-trifluoromethylphenyl)-anthraniloyloxy]-2-hydroxypropoxy}-ethyl ester of N-(3-trifluoromethylphenyl)-anthranilic acid.

The compound is obtained as a viscous substance by chromatography, using the method of preparation described in Example 4. The yield is 8g.

For $C_{33}H_{28}F_6N_2O_6$:
Calculated C 59.80%; H 4.28%; N 4.23%;
Found: C 59.94%; H 4.56%; N 4.29%.

What is claimed is:

1. Compounds of the general formula:

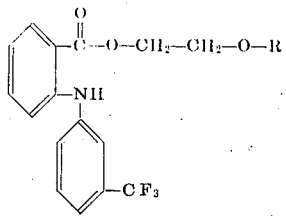

(I)

in which R represents the radical

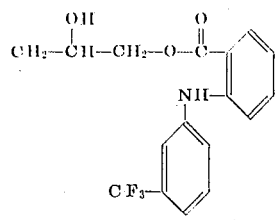

or a lower alkyl group having up to three carbon atoms in which one or two hydrogen atoms are replaced by hydroxyl groups, alkanoyloxy groups having up to four carbon atoms, or lower hydroxyalkoxy groups.

2. Compounds as claimed in claim 1 in which the lower hydroxyalkyl groups contain up to four carbon atoms and up to three hydroxyl groups.

3. The compound of claim 1 which is 2-(2-Hydroxy-ethoxy)-ethyl ester of N-(3-trifluoromethylphenyl)-anthra-nilic acid.

4. The compound of claim 1 which is 2-[2-(2-hydroxyethoxy)-ethoxy]-ethyl ester of N-(3-trifluoromethyl-phenyl)-anthranilic acid.

5. The compound of claim 1 which is 2-(2-acetoxyethoxy)-ethyl ester of N-(3-trifluoromethylphenyl)-anthranilic acid.

6. The compound of claim 1 which is 2-(2,3-Dihydroxy-propoxy)-ethyl ester of N-(3-trifluoromethylphenyl)-anthranilic acid.

7. The compound of claim 1 which is 2-{3-[N-(3-trifluoromethylphenyl)-anthraniloyloxy]-2-hydroxypropoxy}-ester of N-(3-trifluoromethylphenyl)-anthranilic acid.

* * * * *

UNITED STATES PATENT OFFICE
Certificate

Patent No. 3,692,818      Patented September 19, 1972

Karl-Heinz Boltze, Otfried Brendler, and Dietrich Lorenz

Application having been made by Karl-Heinz Boltze, Otfried Brendler, and Dietrich Lorenz, the inventors named in the patent above identified, and Troponwerke Dinklage & Co., a corporation of Germany, the assignee, for the issuance of a certificate under the provisions of Title 35, Section 256, of the United States Code, deleting the name of Otfried Brendler as a joint inventor, and a showing and proof of facts satisfying the requirements of the said section having been submitted, it is this 27th day of November 1973, certified that the name of the said Otfried Brendler is hereby deleted from the said patent as a joint inventor with the said Karl-Heinz Boltze and Dietrich Lorenz.

FRED W. SHERLING,
*Associate Solicitor.*